United States Patent
Xiao et al.

(10) Patent No.: US 12,177,838 B2
(45) Date of Patent: Dec. 24, 2024

(54) PARAMETER DETERMINATION METHOD AND DEVICE FOR COORDINATED MULTI-POINT TRANSMISSION

(71) Applicant: ZTE Corporation, Guangdong (CN)

(72) Inventors: Huahua Xiao, Shenzhen (CN);
Shujuan Zhang, Shenzhen (CN);
Chuangxin Jiang, Shenzhen (CN);
Zhaohua Lu, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 293 days.

(21) Appl. No.: 17/706,836

(22) Filed: Mar. 29, 2022

(65) Prior Publication Data

US 2022/0232603 A1   Jul. 21, 2022

Related U.S. Application Data

(63) Continuation of application No. PCT/CN2020/117186, filed on Sep. 23, 2020.

(30) Foreign Application Priority Data

Sep. 30, 2019 (CN) .......................... 201910944567.7

(51) Int. Cl.
*H04W 72/1273* (2023.01)
*H04L 1/1812* (2023.01)
(Continued)

(52) U.S. Cl.
CPC ....... *H04W 72/1273* (2013.01); *H04L 1/1812* (2013.01); *H04L 5/0053* (2013.01); *H04W 72/0453* (2013.01); *H04W 72/20* (2023.01)

(58) Field of Classification Search
CPC ......... H04W 72/1273; H04W 72/0453; H04W 72/20; H04W 72/23; H04L 1/1812;
(Continued)

(56) References Cited

U.S. PATENT DOCUMENTS 9,014,210 B2   4/2015   Chen et al.
2017/0078830 A1   3/2017   Wu et al.
(Continued)

FOREIGN PATENT DOCUMENTS

CN   103490865 A   1/2014
CN   104040931 A   9/2014
(Continued)

OTHER PUBLICATIONS

Examination report under sections 12 & 13 of the Patents Act, 1970 and the Patents Rules, 2003 dispatched May 8, 2022 for Indian Application No. 202217016999.
(Continued)

*Primary Examiner* — Obaidul Huq
(74) *Attorney, Agent, or Firm* — Crowell & Moring LLP (57) ABSTRACT

Provided are a parameter determination method and device for coordinated multi-point transmission. The parameter determination method includes steps described below. A first parameter is determined, and a second parameter is determined according to the first parameter. The uncertainty problem of some parameter values in the coordinated multi-point transmission in the related art is solved.

17 Claims, 1 Drawing Sheet

(51) Int. Cl.
   *H04L 5/00* (2006.01)
   *H04W 72/0453* (2023.01)
   *H04W 72/20* (2023.01)

(58) Field of Classification Search
   CPC ....... H04L 5/0053; H04L 1/08; H04L 1/1854; H04L 1/1861; H04L 1/1896; H04L 5/0044; H04L 5/0055; H04L 5/0035; H04B 7/024
   USPC .......................................... 370/310, 328, 329
   See application file for complete search history.

(56) References Cited

U.S. PATENT DOCUMENTS

| | | | |
|---|---|---|---|
| 2019/0253220 A1 | 8/2019 | Kim | |
| 2019/0260532 A1 | 8/2019 | Manolakos et al. | |
| 2020/0404667 A1* | 12/2020 | Khoshnevisan | H04W 72/23 |
| 2022/0191081 A1* | 6/2022 | Kim | H04L 5/0094 |
| 2022/0256573 A1* | 8/2022 | Frenne | H04L 5/0053 |

FOREIGN PATENT DOCUMENTS

| | | |
|---|---|---|
| CN | 104184564 A | 12/2014 |
| CN | 107371250 A | 11/2017 |
| CN | 109302272 A | 2/2019 |
| CN | 110087340 A | 8/2019 |
| CN | 110278059 A | 9/2019 |
| CN | 111082910 A | 4/2020 |
| WO | WO 2018/208087 A1 | 11/2018 |
| WO | WO 2021/063227 A1 | 8/2021 |

OTHER PUBLICATIONS

Written Opinion for priority application No. PCT/CN2020/117186 dated Dec. 15, 2020, 4p, in Chinese language.
Search Report for priority application No. PCT/CN2020/117186 dated Dec. 21, 2020, 3p, in Chinese language.
English language translation of the Search Report for priority application No. PCT/CN2020/117186 dated Dec. 21, 2020, 2 p.
Huawei et al, "Enhancement on Multi-TRP/panel transmission," 3GPP TSG RAN WG1 Meeting #96bis R1-1905523, Apr. 8-12, 2019, 22p.
LG Electronics; "Enhancements on multi-TRP/panel transmission"; 3GPP TS RAN WG1 Meeting #98, Prague, Czech Republic; R1-1908699; XP051765307; Aug. 2019; 19 pages.
Qualcomm Incorporated; "Multi-TRP Enhancements"; 3GPP TSG-RAN WG1 Meeting #98, Prague, Czech Republic; R1-1909272; XP051765877; Aug. 2019; 32 pages.
Extended European Search Report dated Oct. 24, 2022 for European Application No. 20872131.6.
First Office Action dated Jul. 18, 2024 for Chinese Patent Application No. 2022104389390, with English translation.
Korean Office Action with English translation, Jun. 27, 2024, pp. 1-24, issued in Korean Patent Application No. 10-2022-7010722, Korean Intellectual Property Office, Daejeon, Korea.
Panasonic, On multi-TRP enhancements for NR MIMO in Rel. 16, Aug. 26-30, 2019, pp. 1-16, R1-1908972, 3GPP TSG RAN WG1 #98, Prague, CZ.
Intel Corporation, On multi-TRP/multi-panel transmission, Aug. 26-30, 2019, pp. 1-24, R1-1908653, #GPP TSG RAN WG1 Meeting #97, Prague, CZ.
First Examination Report dated May 18, 2023 for Canadian Application No. 3,151,964.
Second Examination Report dated Mar. 25, 2024 for Canadian Application No. 3,151,964.

* cited by examiner

PARAMETER DETERMINATION METHOD AND DEVICE FOR COORDINATED MULTI-POINT TRANSMISSION

CROSS REFERENCE

This application is a continuation of International Patent Application No. PCT/CN2020/117186, filed Sep. 23, 2020, which is based on and claims priority to Chinese Patent Application No. 201910944567.7, filed Sep. 30, 2019. Both applications are herein incorporated by reference in their entireties.

TECHNICAL FIELD

The present disclosure relates to the field of communications and, specifically, to a parameter determination method and device for coordinated multi-point transmission.

BACKGROUND

Joint transmission or reception of multi-transmit reception point (Multi-TRP) is an important technology in wireless communication, which is sometimes referred to as coordinated multi-point transmission or multi-point transmission. On the one hand, the coordinated multi-point transmission can transmit different transport blocks (TBs) according to different channel characteristics of multiple nodes, so as to improve the spectrum efficiency of the system. On the other hand, the coordinated multi-point transmission can transmit the same TB or signaling information according to different channel characteristics of multiple nodes, so as to obtain diversity gain and improve the robustness of the system. Due to its importance, the Multi-TRP is supported in various standards such as long term evolution (LTE), long term evolution-advanced (LTE-A), and new radio access technology (NR). However, there are still some problems to be solved in the coordinated multi-point transmission, such as the uncertainty issue of some parameter values in the coordinated multi-point transmission.

In view of the above-described problem in the related art, no effective solution has yet been proposed.

SUMMARY

Embodiments of the present disclosure provide a parameter determination method and device for coordinated multi-point transmission to at least solve the problem of the uncertainty of some parameter values in the coordinated multi-point transmission in the related art.

According to an embodiment of the present disclosure, a parameter determination method for coordinated multi-point transmission is provided. The method includes the following: a first parameter is determined, and a second parameter is determined according to the first parameter.

According to another embodiment of the present disclosure, a parameter determination device for coordinated multi-point transmission is provided. The device includes: a first parameter determination module and a second parameter determination module, the first parameter determination module is configured to determine a first parameter, and the second parameter determination module is configured to determine a second parameter according to the first parameter.

According to another embodiment of the present disclosure, a computer-readable storage medium is further provided. The computer-readable storage medium stores a computer program, and the computer program is configured to, when executed, perform the method described in the above-described method embodiment.

According to another embodiment of the present disclosure, an electronic device is further provided. The electronic device includes a memory and a processor. The memory is configured to store a computer program and the processor is configured to execute the computer program to perform the method described in the above-described method embodiment.

Through the present disclosure, a first parameter is determined, and a second parameter is determined according to the first parameter, which implements the determination of parameters in coordinated multi-point transmission, thereby solving the problem of the uncertainty of some parameter values in the coordinated multi-point transmission in the related art.

DETAILED DESCRIPTION

The present disclosure will be hereinafter described in detail with reference to drawings in conjunction with embodiments. It is to be noted that if not in collision, the embodiments and features therein in the present application may be combined with each other.

It is to be noted that the terms "first", "second" and the like in the description, claims and drawings of the present disclosure are used to distinguish between similar objects and are not necessarily used to describe a particular order or sequence.

First of all, the concepts in the present application are described accordingly:

In the present application, one panel may correspond to one port group (for example, one antenna port group, one antenna group), and panels and port groups may be in the one-to-one correspondence and may be interchangeable with each other. The panel refers to an antenna panel, and one transmission reception point (TRP) or one communication node (including but not limited to a terminal, a base station, and the like) may include at least one antenna panel. One or more antenna elements are provided on each panel, and multiple elements may be virtualized into one antenna port. The base station here may be any one of various types of base stations, such as a macro base station, a micro base station, a wireless remote radio, and a relay. The terminal may include any type of receiving equipment, such as a mobile phone, a data card, a portable device, a notebook, and a computer.

The identifier (including one of the identifier, an index, or an indicator, (ID)) in the present application is used for identifying a serial number or an index of an object. For example, the ID is used for identifying an index corresponding to one reference signal resource, one reference signal resource group, one reference signal resource configuration, one channel state information (CSI) report, one CSI report set, a terminal, a base station, a panel or the like.

To transmit data or signaling, physical channels are divided into physical downlink control channels (PDCCHs), physical uplink control channels (PUCCHs), physical downlink shared channels (PDSCHs), physical uplink shared channels (PUSCHs), and physical random access channels (PRACHs) in the standards. The PDCCH is mainly used for transmitting downlink control information (DCI), the PUCCH is mainly used for transmitting uplink control information such as channel state information (CSI), hybrid automatic repeat request (HARQ), and scheduling request, the PDSCH is mainly used for transmitting downlink data, and the PUSCH is mainly used for transmitting uplink data and information such as CSI, and HARQ-acknowledgement (HARQ-ACK) response information. The PRACH is used for transmitting uplink random access information. The physical uplink channel includes at least one of the PUSCH, the PUCCH or the PRACH, and the physical downlink channel includes at least one of the PDSCH or the PDCCH. The PDCCH here carries control channel information (i.e., DCI). Uplink data transmitted on M physical uplink channels may also be referred to as transmission information, and the transmission information may be information before channel coding, or a transport block, or one code block or a large code block corresponding to multiple code blocks in the uplink control information.

To improve reliability, one manner is to use the hybrid automatic repeat request (HARQ). That is, after a terminal or a base station receives a transport block, if it is detected that the reception is correct, an acknowledgement (ACK) is fed back; otherwise, a negative acknowledgement (NACK) is fed back. The ACK and NACK may be collectively referred to as a HARQ response, and of course, may also be referred to as one of the following: HARQ response information, HARQ-ACK information, HARQ-ACK, HARQ-ACK response, ACK/NACK information, or an ACK/NACK codebook. Unless otherwise specified, the ACK/NACK herein may also be referred to as the HARQ-ACK.

In the related art, one HARQ-ACK bit set of the HARQ, such as a HARQ-ACK codebook, and a HARQ-ACK sub-codebook, is generated for PUCCH detection occasions that are configured by a higher layer and satisfy the requirements and all serving cells (or carrier components (CCs)) corresponding to one TRP, and the HARQ-ACK codebook is fed back in a PUCCH resource or a PUSCH resource. The coding order of the HARQ-ACK codebook is frequency domain first and then time domain, that is, different CCs in the first occasion are arranged from small to large, and then different CCs in a next occasion are arranged from small to large until all occasions configured by the higher-layer are arranged. The feedback type of the HARQ-ACKs of multiple TRPs for the coordinated transmission includes separated HARQ feedback and joint HARQ-ACK feedback. The separated HARQ-ACK feedback (also referred to as separated ACK/NACK feedback, separate ACK/NACK feedback, or separate HARQ-ACK feedback, the ACK/NACK information here may also be written as the HARQ-ACK) is as follows: M HARQ-ACK codebooks are generated and fed back through physical uplink resources, for example, HARQ-ACK information corresponding to control resource sets (CORESETs) or different CORESET groups in one time unit is separately fed back in different PUCCHs. The joint ACK/NACK feedback (or joint HARQ-ACK feedback) is as follows: one HARQ-ACK codebook is generated and then fed back through one physical uplink resource, for example, HARQ-ACK information corresponding to CORESETs or different CORESET groups in one time unit is combined and fed back in one PUCCH, exemplarily, the HARQ-ACK sub-codebook corresponding to the second CORESET group is cascaded after the HARQ-ACK sub-codebook corresponding to the first CORESET group. It is to be noted that the feedback of the HARQ-ACK in one HARQ-ACK codebook means that the HARQ-ACK information is included in the HARQ-ACK codebook and fed back through the physical uplink resource corresponding to the HARQ-ACK codebook.

In order to improve the reliability of data or signaling transmission, one manner is repetition transmission. Transmission of M pieces of data (for example, PDSCHs or PUSCHs) is repetition transmission, representing that the M pieces of data carry exactly the same information, for example, M pieces of data come from the same transport block (TB), and only redundancy versions (RVs) corresponding to the M pieces of data after the channel coding are different, and in some cases, even the RVs corresponding to the M pieces of data after the channel coding are the same. The RVs here refer to different redundancy versions of transmission data subjected to the channel coding, and generally, the RV may be a channel version of $\{0, 1, 2, 3\}$. Similarly, transmission of M pieces of signaling (for example, PDCCHs or PUCCHs) is repetition transmission, representing that the content carried in the M piece of signaling is the same, for example, the content of DCI carried in M PDCCHs is the same (for example, the value in each field of the DCI is the same), exemplarily, the value of the content carried in M PUCCHs is the same. The M pieces of repetition data (for example, M repetition PUSCHs or M repetition PDSCHs) or M pieces of repetition signaling (for example, M repetition PUCCHs or M repetition PDCCHs) may come from M different TRPs, or M different antenna panels, or M different bandwidth parts (BWPs), or M different CCs, where the M antenna panels or M BWPs or M CCs may belong to the same TRP or multiple TRPs. The scheme of repetition transmission includes, but is not limited to, at least one of the following manners: space-division multiplexing (Scheme 1), frequency-division multiplexing (Scheme 2), intra-slot time-division multiplexing (Scheme 3), and inter-slot time-division multiplexing (Scheme 4), where according to whether the coding redundancy versions (that is, redundancy versions) of the transport block are the same, the frequency-division multiplexing (Scheme 2) is divided into two types: Scheme 2a and Scheme 2b, Scheme 2a is when the RVs corresponding to data for repetition transmission are the same; and Scheme 2b is when the RVs corresponding to data for repetition transmission are not the same. M is an integer greater than 1. Of course, the scheme of repetition transmission may also be any combination of the above-described multiplexing manners, such as the combination of space-division multiplexing and frequency-division multiplexing, and the combination of time-division multiplexing and frequency-division multiplexing.

The PDCCH here needs to be mapped to one set of resource elements (REs), for example, including one or more control channel elements (CCEs), where one RE includes one subcarrier in the frequency domain while including one symbol in the time domain. The set of one or more CCEs used for transmitting the PDCCH is sometimes called the control resource set (CORESET), and the CORESET includes multiple physical resource blocks in the frequency domain while including K symbols in the time domain, where K is a natural number, for example, K may be an integer such as 1, 2, and 3. The symbol here includes, but is not limited to, an orthogonal frequency division multiplexing (OFDM) symbol, a single-carrier frequency division multiple access (SC-FDMA), and an orthogonal frequency division multiple access (OFDMA). In order to detect the PDCCH, candidate PDCCHs of a certain aggregation level are configured into one set. The set of candidate PDCCHs under this level is a search space (SS), and a set of multiple search spaces forms one search space set (SS set, SSSET, or SSS). Each terminal may configure at least one search space set. To detect the PDCCH, a PDCCH detection occasion of the current terminal and a detected PDCCH candidate (that is, candidate) or a PDCCH candidate are configured in the search space, where the occasion is also called the PDCCH monitoring occasion, and at the occasion, the time domain information of the detected PDCCH is determined through a PDCCH monitoring offset, a PDCCH monitoring pattern, a PDCCH monitoring periodicity, and the like on an activated downlink bandwidth part (BWP). The candidate, also referred to as the PDCCH detection candidate (that is, PDCCH monitoring candidate), is a candidate to-be-detected PDCCH configured in the search space. In addition, the PDCCH includes a variety of formats. Each format corresponds to one piece of downlink control information (DCI) under the corresponding format, and each DCI includes multiple specific signaling indication fields. The detection may also be referred to as monitoring or blind detection and is mainly used for determining which candidate PDCCH is a PDCCH used for transmitting downlink control information to the terminal. Multiple CORESETs may also be divided into multiple CORESET groups, and each CORESET group includes at least one CORESET.

To better transmit the PUSCH or the PDSCH here, one group of REs consisting of K1 consecutive symbols and L1 frequency-domain subcarriers are formed into one resource block ((RB), sometimes also called physical resource block (PRB or RB)), where K and L are positive integers, for example, K=12 or 14, and L=12. L2 consecutive virtual RBs form one resource block group (RBG), where L2 is a positive integer, for example, 4 or 8, and L2 may be configured through higher-layer signaling, and the virtual RB is an RB obtained after the RB is subjected to certain resource mapping. The consecutive RBs using the same precoding are referred to as a precoding resource block group (PRG), generally including two or four consecutive RBs.

The signal in the present application is a reference signal for measuring various parameters, for example, including, but not limited to, a channel state information-reference signal (CSI-RS) resource, a synchronization signal block (SSB) resource, a physical broadcast channel (PBCH) resource, an SSB/PBCH resource, an uplink sounding reference signal (SRS) resource, a positioning reference signals (PRS), and a phase-tracking reference signal (PTRS). The CSI-RS resource mainly refers to a non zero power channel state information-reference signal (NZP-CSIRS) resource. The interference measurement resource may include, but is not limited to, channel state information-interference measurement (CSI-IM), an NZP-CSI-RS for interference measurement, and zero power channel state information-reference signal (ZP-CSI-RS), where the functions of the CSI-RS and the SRS include CSI measurement, beam management, time-frequency tracking, mobility management, and the like.

In the present application, the channel includes, but is not limited to, at least one of: the PDSCH, the PDCCH, the PUSCH, or the PUCCH, and the control channel includes, but is not limited to, the PDCCH and/or the PUCCH.

Embodiment One

Figure 1:
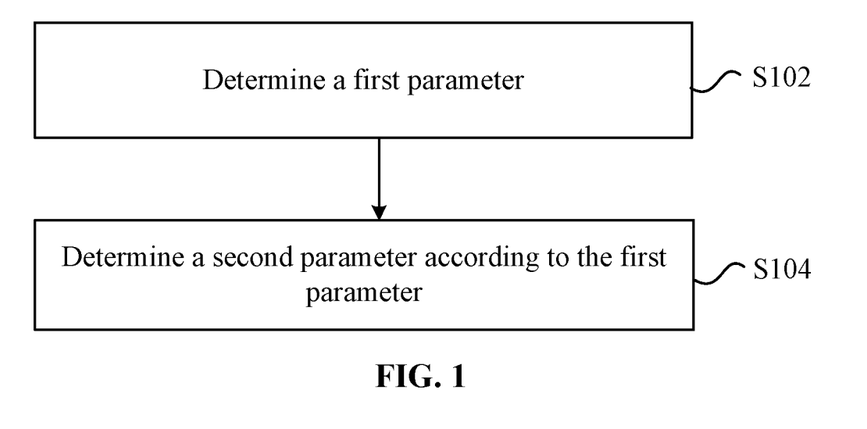
FIG. 1 is a flowchart of a parameter determination method for coordinated multi-point transmission according to an embodiment of the present disclosure.

This embodiment provides a parameter determination method for coordinated multi-point transmission, and the method is executed in a terminal or a transmission node. FIG. 1 is a flowchart of a parameter determination method for coordinated multi-point transmission according to an embodiment of the present disclosure. It is to be noted that the present application is described from the perspective of the terminal side in FIG. 1. As shown in FIG. 1, the method includes S102 and S104.

In S102, a first parameter is determined.

In S104, a second parameter is determined according to the first parameter.

Through S102 and S104 in this embodiment, a first parameter is determined, and a second parameter is determined according to the first parameter, which implements the determination of parameters for coordinated multi-point transmission, thereby solving the problem of the uncertainty of some parameter values in the coordinated multi-point transmission in the related art.

Optionally, the first parameter in this embodiment includes at least one of: the number A of PDCCHs scheduling a PDSCH, the number B of CORESET groups where A PDCCHs are located, a codebook type of the HARQ-ACK, or a feedback type of HARQ-ACKs corresponding to different CORESET groups, where A and B are positive integers.

The second parameter includes a HARQ-ACK bit set where the HARQ-ACK of the PDSCH is located.

The codebook type of the HARQ-ACK includes a dynamic HARQ-ACK codebook and a semi-static HARQ-ACK codebook, where the feedback type of the HARQ-ACKs corresponding to the different CORESET groups includes at least one of separated HARQ-ACK feedback or joint HARQ-ACK feedback.

In an embodiment, the joint HARQ-ACK feedback means that HARQ-ACK information corresponding to different CORESET groups in one time unit is jointly fed back in one physical uplink resource, and the separated HARQ-ACK feedback means that HARQ-ACK information corresponding to different CORESET groups in one time unit is fed back in different physical uplink resources, respectively. Herein, the physical uplink resource includes the PUCCH and/or the PUSCH.

It is to be noted that the PDCCH scheduling the PDSCH is a received PDCCH. In addition, the HARQ-ACK corresponding to one CORESET group includes a HARQ-ACK of a PDSCH scheduled by a PDCCH in this CORESET group.

In an optional implementation of this embodiment, in a case where A is equal to 1, the HARQ-ACK of the PDSCH is included only in one HARQ-ACK bit set.

In a case where A is greater than 1, the HARQ-ACK of the PDSCH is included in C HARQ-ACK bit sets, where C is a positive integer less than or equal to A, or C is a positive integer less than or equal to B.

In addition, in a case where C is greater than 1, values of the HARQ-ACK of the PDSCH included in the C HARQ-ACK bit sets are the same. In a case where A is greater than 1 and C is less than A, the C HARQ-ACK bit sets are determined according to indexes corresponding to PDCCHs, where the indexes corresponding to the PDCCHs include one of: PDCCH candidate indexes, search space indexes, CORESET indexes, or CORESET group indexes. For example, the C HARQ-ACK bit sets are C HARQ-ACK bit sets corresponding to PDSCHs corresponding to indexes corresponding to C PDCCHs with the smallest indexes among the PDCCHs. Alternatively, the C HARQ-ACK bit sets are C HARQ-ACK bit sets corresponding to PDSCHs corresponding to indexes corresponding to C PDCCHs with the largest indexes among the PDCCHs. Alternatively, the C HARQ-ACK bit sets are C HARQ-ACK bit sets corresponding to PDSCHs corresponding to indexes corresponding to C PDCCHs indicated by higher-layer signaling or physical layer signaling. In a case where A is greater than 1 and C is less than B, the C HARQ-ACK bit sets are determined according to indexes of the CORESET groups where the PDCCHs are located. For example, the C HARQ-ACK bit sets are C HARQ-ACK bit sets corresponding to PDSCHs corresponding to C CORESET groups with the smallest CORESET group indexes. Alternatively, the C HARQ-ACK bit sets are C HARQ-ACK bit sets corresponding to PDSCHs corresponding to C CORESET groups with the largest CORESET group indexes. Alternatively, the C HARQ-ACK bit sets are C HARQ-ACK bit sets corresponding to PDSCHs corresponding to C CORESET groups indicated by higher-layer signaling or physical layer signaling.

In an optional implementation of this embodiment, the first parameter includes the feedback type of the HARQ-ACKs, and in response to that the feedback type of the HARQ-ACKs is the separated HARQ-ACK feedback, the HARQ-ACKs are determined to be fed back in a predetermined HARQ-ACK bit set, where the predetermined HARQ-ACK bit set corresponds to a predetermined CORESET group. Herein, the predetermined CORESET group may include at least one of: a CORESET group configured by a higher layer, a CORESET group agreed by the base station and the terminal, a default CORESET group (for example, a first CORESET group), a CORESET group with the smallest CORESET group index or a CORESET group with the largest CORESET group index. The predetermined HARQ-ACK bit set may include at least one of: a HARQ-ACK codebook corresponding to the predetermined CORESET group, a HARQ-ACK bit set configured by a higher layer, a default HARQ-ACK bit set (for example, a first HARQ-ACK bit set), a HARQ-ACK bit set with the smallest HARQ-ACK bit set index or a HARQ-ACK bit set with the largest HARQ-ACK bit set index.

In an optional implementation of this embodiment, the first parameter includes the feedback type of the HARQ-ACKs, and in response to that the feedback type of the HARQ-ACKs is the joint HARQ-ACK feedback, the HARQ-ACKs are determined to be fed back in both a first HARQ-ACK bit set and a second HARQ-ACK bit set, where the first HARQ-ACK bit set corresponds to a first CORESET group, and the second HARQ-ACK bit set corresponds to a second CORESET group.

It is to be noted that at least one of the following is included in this embodiment: 1) the HARQ-ACK bit set includes one of: a HARQ-ACK codebook or a HARQ-ACK sub-codebook, where one HARQ-ACK codebook includes one or more HARQ-ACK sub-codebooks; or 2) different HARQ-ACK bit sets correspond to different CORESET groups.

Optionally, S102 in which the first parameter is determined, when the method is applied to the terminal, includes that the first parameter is determined by receiving the first parameter.

Optionally, S102 in which the first parameter is determined, when the method is applied to the transmission node, further includes that the determined first parameter is transmitted.

In addition, the first parameter in this embodiment also includes a data transmission repetition scheme, and precoding information is determined according to the data transmission repetition scheme.

At least one of the following is included. 1) The data transmission repetition scheme is frequency-division multiplexing, and consecutive resources corresponding to the same transmission configuration indicator (TCI) state in one precoding resource block group (PRG) are determined to use the same precoding. 2) The data transmission repetition scheme is frequency-division multiplexing, and precoding corresponding to different TCI states in one wideband PRG is determined to be different or PRBs corresponding to different TCI states in one wideband PRG are determined to be non-consecutive.

In another optional implementation of this embodiment, the first parameter includes the number E of configuration values for the same kind of parameters configured in a first frequency domain bandwidth and the number F of CORESET groups in a second frequency domain bandwidth. The second parameter includes at least one of: the correspondence between one CORESET group and the same kind of parameters, or a CORESET group for scheduling the first frequency domain bandwidth. E and F are positive integers.

The same type of parameters are parameters of channels and/or signals; the first frequency domain bandwidth and the second frequency domain bandwidth are the same frequency domain bandwidth or different frequency domain bandwidths, and a channel and/or signal in the first frequency domain bandwidth is scheduled by a control channel in the second frequency domain bandwidth.

On the basis of the above, in a case where E is less than F, at least one of the following is included in this embodiment: 1) E CORESET groups of the F CORESET groups schedule the channel in the first frequency domain bandwidth; 2) (F-E) CORESET groups of the F CORESET groups do not schedule the channel in the first frequency domain bandwidth, where the E CORESET groups and E sets of configuration values for the same kind of parameters are in the one-to-one correspondence.

In addition, in a case where E is less than F, this embodiment may further include at least one of the following: an intersection of time-frequency resources among channels and/or signals scheduled by G CORESET groups of the F CORESET groups is null, where G is a positive integer less than or equal to F, and the G CORESET groups correspond to the same configuration values for the same kind of parameters.

In this embodiment, the number E of the values for the same kind of parameters configured in the first frequency domain bandwidth is greater than or equal to the number F of the CORESET groups in the second frequency domain bandwidth, and different CORESET groups in the F CORESET groups correspond to different values in the E values; where the same kind of parameters are parameters of channels and/or signals, the first frequency domain bandwidth and the second frequency domain bandwidth are the same frequency domain bandwidth or different frequency domain bandwidths, and the channel and/or signal in the first frequency domain bandwidth is scheduled by the control channel in the second frequency domain bandwidth.

Optionally, in this embodiment, a parameter value of a channel and/or signal is configured in at least one COREST in a CORESET group and is for the channel and/or signal scheduled by the CORESET group.

It is to be noted that in this embodiment, the same kind of parameters include a scrambling parameter of a channel, such as scrambling code information of a PDSCH, scrambling code information of a PUSCH, scrambling code information of a PDCCH, and scrambling code information of a PDCCH, where the scrambling code information may be a scrambling code index, a scrambling code sequence, an initial value of the scrambling code sequence, and a parameter related to the initial value of the scrambling code sequence.

Optionally, herein, the channel includes, but is not limited to, at least one of: a PDSCH or a PUSCH, and the signal includes, but is not limited to, a PDCCH or a PUCCH.

In another optional implementation of this embodiment, the first parameter may include N pieces of scrambling code information of the PDSCH and M CORESET groups.

At least one of the following is included:
the M CORESET groups correspond to M HARQ-ACK codebooks;
the HARQ-ACK codebooks corresponding to the M CORESET groups are fed back in the manner of separated feedback;
the M CORESET groups are associated with the same PDSCH scrambling code;
PDSCH time domain resources scheduled by the M CORESET groups do not overlap;
data transmission is performed only in a CC configured through scrambling code information of the PDSCH;
the PDSCH is scheduled only in a CORESET configured through scrambling code information of the PDSCH; or
HARQ-ACK response information is fed back only in a CC configured through scrambling code information of the PDSCH.

N and M are positive integers, and N is less than M.

In another optional implementation of this embodiment, the first parameter includes N pieces of scrambling code information of the PDSCH and M CORESETs, where at least one CORESET in the M CORESETs is configured with the scrambling code information of the PDSCH, or the scrambling code information of the PDSCH configured by a CORESET is used for all carrier components or BWPs corresponding to the CORESET, where N and M are positive integers, and N is greater than or equal to M.

It is to be noted that the first parameter includes the configuration of at least one carrier component, and the value of CORESET higher-layer index information corresponding to a CC that does not include the CORESET higher-layer index information is considered by the system to be 0 by default.

The embodiments of the present disclosure will be described below in conjunction with optional embodiments of the present application.

Optional Implementation One

This optional implementation is used for illustrating the construction issue of the HARQ-ACK codebook where the M PDCCHs of repetition transmission schedule one PDSCH, and the feedback type of the HARQ-ACKs is the separated HARQ-ACK feedback.

An example of M TRPs, greater than or equal to two TRPs, is used. In order to improve reliability, the M TRPs repetitively transmitted the PDDCH M times in at least one of the time domain, the frequency domain, or the spatial domain through the repetition transmission technology, and the content of the PDCCH repetition transmission for M times is the same and the PDCCH repetition transmission for all M times schedules the same PDSCH. Each TRP here may simultaneously transmit the PDSCH over multiple CCs through carrier aggregation technology.

M PDCCHs here correspond to M CORESET groups, each CORESET group corresponds to one TRP, and M PDCCHs correspond to M HARQ-ACK codebooks, respectively, that is, the ACK/NACK is fed back separately (the separated ACK/NACK feedback or independent HARQ-ACK feedback).

The terminal receives the M PDCCHs, performs blind detection separately on the M PDCCHs, and determines the time-frequency resource of the scheduled PDSCH according to the result of the blind detection, so as to receive the PDSCH and demodulate the PDSCH. If the demodulation is correct, the HARQ-ACK is ACK; otherwise, the HARQ-ACK is NACK. For the current detection occasion and the current CC, the HARQ-ACK corresponding to the PDSCH is fed back in a predetermined HARQ-ACK codebook, for example, the HARQ-ACK is fed back in the first HARQ-ACK codebook, and even if the first PDCCH is not detected, the HARQ-ACK is still fed back in the first HARQ-ACK codebook. Herein, the predetermined HARQ-ACK codebook may be the HARQ-ACK configured by a higher layer, or a HARQ-ACK codebook with the smallest value of the HARQ-ACK codebook index or a HARQ-ACK codebook with the highest value of the HARQ-ACK codebook index. If there is only one HARQ-ACK codebook, the HARQ-ACK is fed back in the one HARQ-ACK codebook.

The base station obtains the HARQ-ACK codebook corresponding to the PDSCH by receiving the physical uplink channel carrying the predetermined HARQ-ACK codebook, so as to determine the HARQ-ACK information of the PDSCH.

It is to be noted that the TRP in this optional implementation may be replaced with the transmission resource of at least one of an antenna panel, a BWP, or a CC, that is, the M PDCCHs may be transmitted through M antenna panels or M BWPs or M CCs.

The HARQ-ACK here may also be referred to as the HARQ response information or HARQ-ACK information and may have the value of ACK or NACK.

Optional Implementation Two

This optional implementation is used for illustrating the construction issue of the HARQ-ACK codebook in which M PDCCHs of repetition transmission schedule one PDSCH, and the feedback type of the HARQ-ACKs is the joint HARQ-ACK feedback.

An example of M TRPs, greater than or equal to two TRPs, is used. In order to improve reliability, the M TRPs repetitively transmitted the PDDCH for M times in at least one of the time domain, the frequency domain, or the spatial domain through repetition transmission technology, and the content of the PDCCH repetition transmission for M times is the same and the PDCCH repetition transmission for all M times schedules the same PDSCH. Herein, each TRP may simultaneously transmit the PDSCH over multiple CCs through carrier aggregation technology.

In this optional implementation, M PDCCHs correspond to M CORESET groups, each CORESET group corresponds to one TRP, and M PDCCHs correspond to one joint HARQ-ACK codebook, that is, the ACK/NACK is fed back jointly (joint ACK/NACK feedback).

The terminal receives the M PDCCHs, performs blind detection separately on the M PDCCHs, and determines the time-frequency resource of the scheduled PDSCH according to the result of the blind detection, so as to receive the PDSCH and demodulate the PDSCH. If the demodulation is correct, the HARQ-ACK is the ACK; otherwise, the HARQ-ACK is the NACK. For the current detection occasion and the current CC, an $i^{th}$ PDCCH corresponds to an $i^{th}$ HARQ-ACK sub-codebook, and the HARQ-ACK corresponding to the PDSCH in M HARQ-ACK sub-codebooks is the same, which is either the ACK or the NACK, where i=1, . . . , M.

The M HARQ-ACK sub-codebooks are cascaded to form one joint codebook. For example, the bit information of a $k^{th}$ HARQ-ACK sub-codebook is cascaded after the bit information of a $(k-1)^{th}$ HARQ-ACK sub-codebook to form a new HARQ-ACK codebook, and the new HARQ-ACK codebook is fed back through an uplink physical channel, where k=2, . . . , M.

The base station obtains the HARQ-ACK codebook by receiving the physical uplink channel carrying the predetermined HARQ-ACK codebook, so as to obtain the HARQ-ACK information of the PDSCH.

It is to be noted that the TRP in this optional implementation may be replaced with the transmission resource of at least one of an antenna panel, a BWP or a CC, that is, the M PDCCHs may be transmitted through M antenna panels or M BWPs or M CCs.

The HARQ-ACK here may also be referred to as the HARQ response information or HARQ-ACK information and may have the value of ACK or NACK.

Optional Implementation Three

This optional implementation is described by using an example of M TRPs, greater than or equal to two TRPs. In order to improve reliability, the M TRPs repetitively transmitted the PDSCH for M times in at least one of the time domain, the frequency domain or the spatial domain through repetition transmission technology, and the PDSCHs repetitively transmitted M times may come from the same redundancy version or different redundancy versions of the same transport block.

In this optional implementation, each of M PDCCHs corresponds to one CORESET group, and the higher-layer signaling may configure one higher-layer index for each CORESET group, for example, the higher-layer index may be a CORESET group index i, where i=0, . . . , (M−1). Each CORESET group corresponds to one transmission configuration indicator (TCI) state, and each TCI state includes at least one reference signal and at least one quasi co-location (QCL) type, where the QCL is divided into at least four types, QCL-Type A, QCL-Type B, QCL-Type C and QCL-Type D, according to different types of large-scale information to be protected.

M TRPs perform the repetition transmission of M PDSCHs in the frequency-division multiplexing. The PDSCH of each TRP corresponds to one TCI state so that the terminal and the base station may determine from which TRP the PDSCH comes through the TCI state or determine that an $i^{th}$ PDSCH corresponds to an $i^{th}$ TCI state. The PDCCH, PDSCH and reference signal of the same TCI state come from the same TRP. The TRPs herein may be replaced with M panels of K TRPs or M CCs of K TRPs, where K is a positive integer less than or equal to M and may have the value of 1.

When the base station configures the time-frequency resources for the terminal, consecutive RBs in the PRGs corresponding to the same TCI state use the same precoding while consecutive RBs in the PRGs corresponding to different TCI states use different precoding; or frequency domain resources corresponding to two TCI states are non-consecutive; or the base station assumes that the same precoding is used in any RBs that are consecutively allocated, where the consecutive RBs are in one PRG and correspond to the same TCI state.

When receiving the PDSCH, the terminal assumes that the same precoding is used in any RBs that are consecutively allocated, where the consecutive RBs are in one PRG and correspond to the same TCI state.

That is, both the terminal and the base station assume that RBs in PRGs corresponding to the same TCI state are consecutive and use the same precoding while RBs in PRGs corresponding to different TCI states are non-consecutive and need to use different precoding, because different TCI states correspond to different TRPs which generally have different precoding and the joint channel estimation cannot be performed.

Optional Implementation Four

This optional implementation is used for illustrating the parameter determination issue in a case where the number of PDSCH scrambling codes transmitted by M TRPs is less than the number of CORESET groups.

An example of M TRPs, greater than or equal to two TRPs, is used. Each TRP may simultaneously transmit the PDSCH over multiple CCs through carrier aggregation technology, for example, each TRP includes at least one CC. It is assumed here that each CORESET group corresponds to one TRP, and a PDSCH scheduled by the PDCCH corresponding to each CORESET group has the separated HARQ-ACK feedback, that is, there are M separated HARQ-ACK codebooks.

In one transmission, if an $i^{th}$ TRP only uses one CC to perform data transmission, for example, the $i^{th}$ TRP only uses CC1 to transmit the PDSCH, both the base station and the terminal determine that the HARQ-ACK codebook corresponding to the $i^{th}$ TRP does not include other HARQ response except the HARQ response of CC1, that is, only the ACK/NACK of CC1 is fed back, where the $i^{th}$ TRP may be any TRP among M TRPs.

In one transmission, if a $k^{th}$ CC only has one PDSCH scrambling code, only one TRP transmits the PDSCH on the $k^{th}$ CC, where k here may be a positive integer, such as 1, 2, 3, and 4, and the terminal only receives the PDSCH on the $k^{th}$ CC transmitted by one TRP. In this scenario, if PDSCHs scheduled by the PDCCHs corresponding to the M CORESET groups jointly feed back the ACK/NACK, the higher layer may configure only one CORESET group.

In one transmission, if the BWP or CC corresponding to a $j^{th}$ CORESET group does not include the PDSCH scrambling code, both the base station and the terminal determine that the base station corresponding to the CORESET group does not transmit the PDSCH, where the $j^{th}$ CORESET group may be any one of the M CORESET groups, and the value of j is one of 1, . . . , or M.

In one transmission, the M CORESET groups are associated with the same PDSCH scrambling code. The PDSCHs scheduled by the M CORESET groups are transmitted without overlapping in the time domain or in the frequency domain.

Optional Implementation Five

This optional implementation is used for illustrating the parameter determination in a case where the number of PDSCH scrambling codes transmitted by M TRPs is greater than the number of CORESET groups.

The optional implementation is described by using an example of M TRPs, greater than or equal to two TRPs. Each TRP may simultaneously transmit PDSCHs over multiple CCs through carrier aggregation technology, for example, each TRP includes at least one CC. It is assumed here that each CORESET group corresponds to one TRP.

In one transmission, a PDSCH scrambling code index (also called PDSCH scrambling code indicator (ID)) is configured in a $j^{th}$ CORESET group through the higher-layer signaling. The PDSCH scrambling code index is used for indicating one PDSCH scrambling code sequence for scrambling the transmission bits of the PDSCH, so as to reduce the interference between PDSCHs. The PDSCH scrambling code ID may be used for all CCs or BWPs scheduled by the $j^{th}$ CORESET group, in other words, the PDSCH in each CC (BWP) scheduled by the $j^{th}$ CORESET group corresponds to the same PDSCH scrambling code ID. The $j^{th}$ CORESET group may be any one of the M CORESET groups.

Optional Implementation Six

This optional implementation is used for illustrating the default value issue of the default CORESET group of one CC corresponding to a certain TRP when there is more than one CORESET but this certain TRP has only the one CC, or when no higher-layer parameter index is configured in CORESETs transmitted by M TRPs.

The optional implementation is described by using an example of M TRPs, greater than or equal to two TRPs. Each TRP may simultaneously transmit the PDSCH over multiple CCs through carrier aggregation technology, for example, each TRP includes at least one CC. There is more than one CORESET group here.

In one transmission, a $i^{th}$ TRP uses only one CC to transmit data through the higher-layer signaling.

When M CORESETs are configured by the higher-layer signaling, the CORESET group corresponding to the CC used for transmitting data by the $j^{th}$ TRP is CORESET group 0 or a CORESET group with the smallest value of the higher-layer index by default, where the $j^{th}$ TRP may be any TRP of the M TRPs.

In one transmission, the $j^{th}$ TRP uses only K CCs to transmit data through the higher-layer signaling. When M CORESETs are configured by the higher-layer signaling, the CORESET groups corresponding to the CCs used for transmitting data by the $j^{th}$ TRP are CORESET group 0 to CORESET group K or K CORESET groups with the smallest values of the higher-layer index by default, where the $j^{th}$ TRP may be any TRP of the M TRPs, and K is a positive integer less than M.

From the description of the preceding embodiments, it is apparent to those skilled in the art that the method in the preceding embodiments may be implemented by software plus a necessary general-purpose hardware platform or may of course be implemented by hardware. However, in many cases, the former is a preferred implementation. Based on this understanding, the solution provided by the present disclosure substantially, or the part contributing to the related art, may be embodied in the form of a software product. The computer software product is stored in a storage medium (such as a read-only memory (ROM)/a random access memory (RAM), a magnetic disk or an optical disk) and includes several instructions for enabling a terminal device (which may be a mobile phone, a computer, a server, a network device or the like) to execute the method according to each embodiment of the present disclosure.

Embodiment Two

This embodiment further provides a parameter determination device for coordinated multi-point transmission. The device is used for implementing the embodiments and preferred embodiments described above. What has been described is not repeated here. As used below, the term "module" may be software, hardware, or a combination thereof capable of implementing predetermined functions. The device in the embodiments described below is preferably implemented by software, but the implementation by hardware or by a combination of software and hardware is also possible and conceivable.

Figure 2:
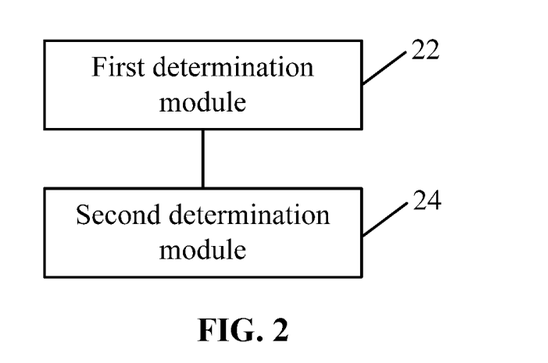
FIG. 2 is a structural block diagram of a parameter determination device for coordinated multi-point transmission according to an embodiment of the present disclosure.

FIG. 2 is a structural block diagram of a parameter determination device for coordinated multi-point transmission according to an embodiment of the present disclosure. The device is applied to a terminal side, and as shown in FIG. 2, the device includes a first parameter determination module 22 and a second parameter determination module 24. The first parameter determination module 22 is configured to determine a first parameter. The second parameter determination module 24 is coupled with the first parameter determination module 22 and configured to determine a second parameter according to the first parameter.

Optionally, the first parameter in this embodiment includes at least one of: the number A of PDCCHs scheduling a PDSCH, the number B of CORESET groups where A PDCCHs are located, a codebook type of a HARQ-ACK, or a feedback type of HARQ-ACKs corresponding to different CORESET groups, where A and B are positive integers. The second parameter includes a HARQ-ACK bit set where a HARQ-ACK of the PDSCH is located. The codebook type of the HARQ-ACK includes a dynamic HARQ-ACK codebook and a semi-static HARQ-ACK codebook, where the feedback type of the HARQ-ACKs corresponding to the different CORESET groups includes at least one of: separated HARQ-ACK feedback or joint HARQ-ACK feedback.

It is to be noted that the PDCCH scheduling the PDSCH is a received PDCCH. In addition, a HARQ-ACK corresponding to one CORESET group includes a HARQ-ACK of a PDSCH scheduled by a PDCCH in this CORESET group.

In an optional implementation of this embodiment, in a case where A is equal to 1, the HARQ-ACK of the PDSCH is included only in one HARQ-ACK bit set. In a case where A is greater than 1, the HARQ-ACK of the PDSCH is included in C HARQ-ACK bit sets, where C is a positive integer less than or equal to A, or C is a positive integer less than or equal to B.

In addition, in a case where C is greater than 1, values of the HARQ-ACK of the PDSCH included in the C HARQ-ACK bit sets are the same. In a case where A is greater than 1 and C is less than A, the C HARQ-ACK bit sets are determined according to indexes corresponding to the PDCCHs, where the indexes corresponding to the PDCCHs include one of the following: PDCCH candidate indexes, search space indexes, CORESET indexes or CORESET group indexes. In a case where A is greater than 1 and C is less than B, the C HARQ-ACK bit sets are determined according to indexes of the CORESET groups where the PDCCHs are located.

In an optional implementation of this embodiment, the first parameter includes the feedback type of the HARQ-ACKs, and in response to the feedback type of the HARQ-ACKs being the separated HARQ-ACK feedback, the HARQ-ACK of one PDSCH is determined to be fed back in a predetermined HARQ-ACK bit set, where the predetermined HARQ-ACK bit set corresponds to a predetermined CORESET group.

In an optional implementation of this embodiment, the first parameter includes the feedback type of the HARQ-ACKs, and in response to the feedback type of the HARQ-ACKs being the joint HARQ-ACK feedback, the HARQ-ACK is determined to be fed back in both the first HARQ-ACK bit set and the second HARQ-ACK bit set, where the first HARQ-ACK bit set corresponds to the first CORESET group, and the second HARQ-ACK bit set corresponds to the second CORESET group.

It is to be noted that at least one of the following is included in this embodiment: 1) the HARQ-ACK bit set includes one of: a HARQ-ACK codebook or a HARQ-ACK sub-codebook, where one HARQ-ACK codebook includes one or more HARQ-ACK sub-codebooks; and 2) different HARQ-ACK bit sets correspond to different CORESET groups.

In addition, in this embodiment, the first parameter also includes a data transmission repetition scheme, and precoding information is determined according to the data transmission repetition scheme.

At least one of the following is included. 1) The data transmission repetition scheme is frequency-division multiplexing, and consecutive resources corresponding to the same TCI state in one PRG are determined to use the same precoding. 2) The data transmission repetition scheme is frequency-division multiplexing, and precoding corresponding to different TCI states in one wideband PRG is determined to be different or PRBs corresponding to different TCI states in one wideband PRG are determined to be non-consecutive.

In another optional implementation of this embodiment, the first parameter includes the number E of configuration values for the same kind of parameters configured in a first frequency domain bandwidth and the number F of CORESET groups in a second frequency domain bandwidth. The second parameter includes at least one of: a correspondence between one CORESET group and the same kind of parameters, or a CORESET group scheduling the first frequency domain bandwidth. E and F are positive numbers.

The same type of parameters are parameters of channels and/or signals; the first frequency domain bandwidth and the second frequency domain bandwidth are the same frequency domain bandwidth or different frequency domain bandwidths, and a channel and/or a signal in the first frequency domain bandwidth is scheduled by a control channel in the second frequency domain bandwidth.

On the basis of the above, in a case where E is less than F, this embodiment includes at least one of the following: 1) E CORESET groups of the F CORESET groups schedule a channel in the first frequency domain bandwidth; and 2) (F-E) CORESET groups of the F CORESET groups do not schedule a channel in the first frequency domain bandwidth, where the E CORESET groups and E sets of configuration values for the same kind of parameters are in a one-to-one correspondence.

In addition, in a case where E is less than F, this embodiment may further include at least one of the following: an intersection of time-frequency resources among channels and/or signals scheduled by G CORESET groups of the F CORESET groups is null, where G is a positive integer less than or equal to F, and the G CORESET groups correspond to the same configuration values for the same kind of parameters.

In this embodiment, the number E of the values for the same kind of parameters configured in the first frequency domain bandwidth is greater than or equal to the number F of the CORESET groups in the second frequency domain bandwidth, and different CORESET groups in the F CORESET groups correspond to different values in the E values; where the same kind of parameters are parameters of channels and/or signals, the first frequency domain bandwidth and the second frequency domain bandwidth are the same frequency domain bandwidth or different frequency domain bandwidths, and the channel and/or signal in the first frequency domain bandwidth is scheduled by a control channel in the second frequency domain bandwidth.

Optionally, in this embodiment, a parameter value of a channel and/or signal is configured in at least one CORESET in a CORESET group and is used for channels and/or signals scheduled by the CORESET group.

It is to be noted that in this embodiment, the same kind of parameters include a scrambling parameter of a channel, such as scrambling code information of a PDSCH, scrambling code information of a PUSCH, scrambling code information of a PDCCH and scrambling code information of a PDCCH, where the scrambling code information may be a scrambling code index, a scrambling code sequence, an initial value of the scrambling code sequence, and a parameter related to the initial value of the scrambling code sequence.

In another optional implementation of this embodiment, the first parameter may include N pieces of PDSCH scrambling code information and M CORESET groups.

At least one of the following is included.

M CORESET groups correspond to M HARQ-ACK codebooks;

the HARQ-ACK codebooks corresponding to M CORESET groups are fed back in a manner of separated feedback;

M CORESET groups are associated with the same PDSCH scrambling code;

PDSCH time domain resources scheduled by the M CORESET groups do not overlap;

data transmission is performed only in a CC configured through scrambling code information of the PDSCH;

the PDSCH is scheduled only in a CORESET configured through scrambling code information of the PDSCH.

HARQ-ACK response information is fed back only in a CC configured through scrambling code information of the PDSCH.

N and M are positive integers and N is less than M.

In another optional implementation of this embodiment, the first parameter includes N pieces of PDSCH scrambling code information and M CORESETs, where at least one CORESET in the M CORESETs is configured with the scrambling code information of the PDSCH, or the scrambling code information of the PDSCH configured by a CORESET is used for all CCSs or BWPs corresponding to the CORESET, N and M are positive integers, and N is greater than or equal to M.

It is to be noted that the first parameter includes the configuration of at least one CC, and the value of CORESET higher-layer index information corresponding to a CC that does not include the CORESET higher-layer index information is considered by the system to be 0 by default.

It is to be noted that the various modules described above may be implemented by software or hardware. An implementation by hardware may, but may not necessarily, be performed in the following manners: the various modules described above are located in the same processor, or the various modules described above are located in their respective processors in any combination form.

Embodiment Three

This embodiment of the present disclosure further provides a storage medium. The storage medium stores a computer program. The computer program is configured to, when executed, perform the method in any one of the method embodiments described above.

Optionally, in this embodiment, the storage medium may be configured to store a computer program for performing a method including S1 and S2.

In S1, a first parameter is determined.

In S2, a second parameter is determined according to the first parameter.

Optionally, in this embodiment, the storage medium may include, but is not limited to, a universal serial bus (USB) flash drive, a read-only memory (ROM), a random access memory (RAM), a mobile hard disk, a magnetic disk, an optical disk or another medium capable of storing a computer program.

An embodiment of the present disclosure further provides an electronic device. The electronic device includes a memory and a processor. The memory stores a computer program. The processor is configured to execute the computer program to perform the method in any one of the method embodiments described above.

Optionally, the electronic device may further include a transmission device and an input/output device. Both the transmission device and the input/output device are connected to the processor.

Optionally, in this embodiment, the processor may be configured to perform the method including S1 and S2 described below through a computer program.

In S1, a first parameter is determined.

In S2, a second parameter is determined according to the first parameter.

Optionally, for specific examples in this embodiment, reference may be made to the examples described in the embodiments and optional embodiments described above. What has been described is not repeated here.

Apparently, it is to be understood by those skilled in the art that the modules or steps of the present disclosure may be implemented by a general-purpose computing apparatus and may be concentrated on a single computing apparatus or distributed in a network formed by multiple computing apparatuses. Optionally, these modules or steps may be implemented by program codes executable by the computing apparatus. Thus, these modules or steps may be stored in a storage apparatus and executed by the computing apparatus. Moreover, in some cases, the illustrated or described steps may be executed in a sequence different from the sequence described herein. Alternatively, each of these modules or steps may be implemented by being made into an integrated circuit module or multiple modules or steps among these modules or steps may be implemented by being made into a single integrated circuit module. In this way, the present disclosure is not limited to any specific combination of hardware and software.

The preceding is only preferred embodiments of the present disclosure and not intended to limit the present disclosure. For those skilled in the art, the present disclosure may have various modifications and variations. Any modifications, equivalent substitutions, improvements and the like within the principle of the present disclosure are within the scope of the present disclosure.

What is claimed is:

1. A parameter determination method performed in a wireless terminal device, comprising:
obtaining a first transmission parameter;
determining that the first transmission-parameter comprises a data transmission repetition scheme;
in response to the data transmission repetition scheme indicating a frequency-division multiplexing scheme, determining that same precoding is used for consecutive radio resources in frequency corresponding to a same transmission configuration indicator (TCI) state in one precoding resource block group (PRG); and
in response to the data transmission repetition scheme indicating the frequency-division multiplexing scheme, determining that precoding corresponding to different TCI states in one wideband PRG differs from one another.

2. The method of claim 1, wherein:
the first parameter further comprises at least one of: a number A of physical downlink control channels (PDCCHs) scheduling a physical downlink shared channel (PDSCH), a number B of control resource set (CORESET) groups where A PDCCHs are located, a codebook type of a hybrid automatic repeat request acknowledgement (HARQ-ACK), or a feedback type of HARQ-ACKs corresponding to different CORESET groups, wherein A and B are positive integers;
the method further comprises determining a second parameter according to the first parameter;
the second parameter comprises a HARQ-ACK bit set where a HARQ-ACK of the PDSCH is located;
the codebook type of the HARQ-ACK comprises a dynamic HARQ-ACK codebook and a semi-static HARQ-ACK codebook; and
the feedback type of the HARQ-ACKs corresponding to the different CORESET groups comprises at least one of: separated HARQ-ACK feedback or joint HARQ-ACK feedback.

3. The method of claim 2, wherein
when A is equal to 1, the HARQ-ACK of the PDSCH is only included in one HARQ-ACK bit set; and
when A is greater than 1, the HARQ-ACK of the PDSCH is comprised in C HARQ-ACK bit sets, wherein C is a positive integer less than or equal to A, or C is a positive integer less than or equal to B.

4. The method of claim 3, wherein the method further comprises:
when C is greater than 1, determining values of the HARQ-ACK of the PDSCH comprised in the C HARQ-ACK bit sets to be the same;
when A is greater than 1 and C is less than A, determining the C HARQ-ACK bit sets according to indexes corresponding to the PDCCHs, wherein the indexes corresponding to the PDCCHs comprise one of the following: PDCCH candidate indexes, search space indexes, CORESET indexes or CORESET group indexes; and
when A is greater than 1 and C is less than B, determining the C HARQ-ACK bit sets according to indexes of the CORESET groups where the PDCCHs are located.

5. The method of claim 3, wherein
acquiring a value of C according to at least one of the following parameters: the codebook type of the HARQ-ACK or a feedback type of HARQ-ACK information corresponding to a CORESET group.

6. The method of claim 2, wherein:
the HARQ-ACK bit set comprises one of: a HARQ-ACK codebook or a HARQ-ACK sub-codebook, wherein one HARQ-ACK codebook comprises at least one HARQ-ACK sub-codebook; or
the different HARQ-ACK bit sets correspond to different CORESET groups.

7. The method of claim 1, further comprising at least one of:
in response to that a feedback type of a hybrid automatic repeat request (HARQ) is separated HARQ-acknowledgement (HARQ-ACK) feedback, determining that a HARQ-ACK is fed back in a predetermined HARQ-ACK bit set, wherein the predetermined HARQ-ACK bit set corresponds to a predetermined control resource set (CORESET) group; or in response to that a feedback type of a HARQ is joint HARQ-ACK feedback, determining that a HARQ-ACK is fed back in B HARQ-ACK bit sets, wherein the B HARQ-ACK bit sets correspond to B CORESET groups.

8. The method of claim 1, wherein the TCI state is associated with at least one reference signal and at least one quasi co-location (QCL) type.

9. The method of claim 8, wherein each of the at least one the QCL type belongs to a set of at least four QCL types differentiated according to different types of large-scale information.

10. The method of claim 1, wherein
the first parameter further comprises: a number E of configuration values for a same kind of parameters configured in a first frequency domain bandwidth and a number F of control resource set (CORESET) groups in a second frequency domain bandwidth, wherein E and F are positive integers;
the method further comprises determining a second parameter according to the first parameter;
the second parameter comprises at least one of: a correspondence between a CORESET group and the same kind of parameters, or a CORESET group for scheduling the first frequency domain bandwidth;
the same kind of parameters are parameters of channels and/or signals; and
the first frequency domain bandwidth and the second frequency domain bandwidth are a same frequency domain bandwidth or different frequency domain bandwidths, and a channel and/or a signal in the first frequency domain bandwidth is scheduled by a control channel in the second frequency domain bandwidth.

11. A wireless communication device, comprising a memory for storing instructions and a processor in communication with the memory and configured to execute the instructions to:
obtain a first transmission parameter;
determine that the first transmission parameter comprises a data transmission repetition scheme;
in response to the data transmission repetition scheme indicating a frequency-division multiplexing scheme, determine that same precoding is used for consecutive radio resources in frequency corresponding to a same transmission configuration indicator (TCI) state in one precoding resource block group (PRG); and
in response to the data transmission repetition scheme indicating the frequency-division multiplexing scheme, determine that precoding corresponding to different TCI states in one wideband PRG differs from one another.

12. The wireless communication device of claim 11, wherein the TCI state is associated with at least one reference signal and at least one quasi co-location (QCL) type.

13. The wireless communication device of claim 12, wherein ach of the at least one the QCL type belongs to a set of at least four QCL types differentiated according to different types of large-scale information.

14. A transmission method performed in a wireless base station or access point:
transmitting a first transmission parameter to a wireless terminal, the first transmission parameter comprising a data transmission repetition scheme;
when the data transmission repetition scheme is a frequency multiplexing scheme, instructing the wireless terminal via the first parameter that same precoding is to be used for consecutive radio resources in frequency corresponding to a same transmission configuration indicator (TCI) state in one precoding resource block group (PRG), and transmitting data to the wireless terminal using the same precoding in the consecutive ratio resources corresponding to the same TCI state in the one precoding PRG; and
when the data transmission repetition scheme is a frequency multiplexing scheme, instructing the wireless terminal that precoding corresponding to different TCI states in one wideband PRG differs from one another.

15. The transmission method of claim 14, wherein the TCI state is associated with at least one reference signal and at least one quasi co-location (QCL) type.

16. The transmission method of claim 15, wherein the at least one QCL type belongs to a set of at least four QCL types differentiated according to different types of large-scale information.

17. A wireless base station or access point, comprising a memory for storing instructions and a processor in communication with the memory and configured to execute the instructions to perform the method of claim 14.

* * * * *